United States Patent [19]

Cherry

[11] Patent Number: 4,705,315
[45] Date of Patent: Nov. 10, 1987

[54] SLIDABLE STORAGE CONTAINER

[76] Inventor: Kim N. Cherry, 1524 Meridian St., Meridian, Id. 83642

[21] Appl. No.: 917,684

[22] Filed: Oct. 10, 1986

[51] Int. Cl.$^4$ .............................................. B60R 11/06
[52] U.S. Cl. .................................. 296/37.1; 296/37.6; 296/24 R; 312/335
[58] Field of Search ................. 296/37.6, 37.10, 24 R, 296/26, 21; 312/330 R, 335, 339; 224/42.42 R

[56] References Cited
U.S. PATENT DOCUMENTS

| 2,784,027 | 3/1957 | Temp | 296/156 |
| 3,826,529 | 7/1974 | Wood | 296/37.6 |
| 4,305,695 | 12/1981 | Zachrich | 296/37.1 |
| 4,573,731 | 3/1986 | Knaack et al. | 296/37.6 |

Primary Examiner—Robert R. Song
Attorney, Agent, or Firm—Frank J. Dykas

[57] ABSTRACT

A storage container encompasses most the usable cargo space of a trade van. The shortage container is mounted on an extension track which permits an operator to fully extract the storage container through the open cargo doors so that the storage container is accessible from all sides.

3 Claims, 4 Drawing Figures

SLIDABLE STORAGE CONTAINER

BACKGROUND OF THE INVENTION

1. Field of Invention:

This invention relates to a slidable storage container for use in trade vans and the like. More particularly it is a storage container which encompasses most of the usable cargo space of a trade van, and is mounted on an extension track which permits the operator to fully extract the storage container through the open cargo doors of the van so that the storage container is accessible from all sides.

2. Description of the Prior Art:

Numerous containers have been developed over the years for increasing the enclosed storage of a conventional pickup truck bed. Some of the devices that have been developed are disclosed in TEMP U.S. Pat. No. 2,784,027 dated Mar. 5, 1957 and KNAACK et al. U.S. Pat. No. 4,573,731 dated Mar. 4, 1986. Both of these disclose drawer units for installation between the wheel wells of the bed of a pickup truck. Both drawers utilize what are commonly known as suspension racks to provide ease of pulling the drawer from its container. WOOD U.S. Pat. No. 3,826,529 discloses a similar use of suspension racks for use with a sliding cabinet which is supported lengthwise along the side of the pickup truck bed above the wheel well. RAFI-ZADEH U.S. Pat. No. 4,469,364 discloses a similar device which incorporates additional features of a canopy covering the entire pickup truck bed. TUOHY, III U.S. Pat. No. 4,522,326 dated; June 11, 1985 and HAMILTON et al. U.S. Pat. No. 4,635,992 dated Jan. 13, 1987 both disclose tool boxes suspended on sliding racks wherein the tool box can be positioned at the front of the pickup truck bed or slid to the rear for easier access. HAMILTON et al. discloses the further feature of a top closure for the tool box which can be utilized beneath a camper shell which has sloping sidewalls and limited headroom.

While all the above device disclose methods of improving closed storage for pickup trucks, none of them meet the enclosed storage requirements of certain trades and crafts wherein the tradesman is required to carry a large and varied inventory of parts, supplies and tools to remote job locations. Examples of these trades and crafts would include plumbers, electricians, telephone repairmen, furnace and air conditioning repairmen, appliance repairmen and the like.

All of these tradesmen are required to carry large inventories of parts, supplies and tools in order to function effectively.

The traditional solution in these trades is to utilize a trade van type of vehicle. These vans are usually built on chassis of similar size and load carrying capacity to those of conventional pickup trucks, however the entire body of the vehicle is enclosed. Cargo doors are traditionally provided at the rear and the right side of the vehicle for access to the cargo area. Cargo areas have limited headroom, which is generally insufficient for the tradesman to enter, except in a crouching or stooped position.

Makeshift shelves are usually installed by the tradesman along the sidewalls of the cargo area. Because of structural requirements of the vehicle there usually are integrated braces protruding from the sidewalls of the cargo area, which are often times curved or sloped. The result is that it is difficult to install sidewall shelving that embodies anything other than minimal storage space increases over what can be done by just stacking the inventory of parts and supplies on the floor. Additionally, because of the limited capacity of the sidewall storage, often times the floor of the cargo area, which has been reduced to nothing more than a narrow passageway between the shelves, is often littered with boxes of parts and supplies.

The suspension drawer as described above in TEMP and KNAACK et al. cannot be effectively used with a trade van since the already limited headroom of the cargo area of a trade van would be more severely restricted, making significant portions of the cargo area inaccessible to the tradesman. Additionally, these type of devices would be very difficult to install and would not withstand the heavy payload requirements required by these types of trades.

Likewise the containers and tool boxes described in the other above mentioned patents are not designed to significantly increase enclosed storage within a trade van, but instead are adapted to provide closed storage in an otherwise unprotected environment of an open pickup truck bed.

What is needed is a storage container which greatly enhances the ability to utilize the entire cargo volume area of a trade van and further, provide for easy accessability to that storage area.

Such a storage container should also be able to withstand heavy payloads, normally between 1,000 pounds to 2,000 pounds, since those types of payloads are routinely carried by trades people such as electricians, plumbers and the like.

SUMMARY OF INVENTION

Accordingly, it is an object of this invention to provide a storage container which will utilize substantially all of the available volume of cargo space in a trade van for the storage of articles such as parts, supplies, tools and the like. Additionally, it is an object of this invention to provide a storage container which can be withdrawn or extracted through the cargo doors of the trade van so that it becomes easily accessible from all sides.

Another object of this invention is to provide a storage container which has a plurality of bins, storage shelves, ladder hooks and the like which can be utilized to store a large and varied inventory of parts, supplies and tools. Another object of this invention is to provide a suspension systems for use in withdrawing the storage container from the trade van which is capable of handling payloads of up to 2,000 pounds. Another object is to provide a suspension system which holds the storage container suspended above the ground without the need for supporting braces or legs, thus facilitating the ease of use and the ability for one person to withdraw the storage container from the van without assistance.

These objects are accomplished by use of a storage container, having a plurality of bins and is of a design and configuration such as to utilize a substantial volume of the available cargo area of a trade van. This container is attached atop a frame which allows for it to be fully withdrawn through the cargo doors of a trade van so that it becomes accessible from all four sides.

Van frame members are attached to the bed of the cargo area in a position perpendicular to the cargo doors through which the container is to be withdrawn. The said van frame members each have a pair of rollers attached thereto, with one of the rollers, the van frame end rollers, attached to the van frame members at the end of the frame nearest to the cargo door, and the second roller of each pair, being a van frame intermediate stop roller located approximately one-third of the length of the frame member back from the end stop roller.

Slide rails, having channels adapted to receive the van frame rollers are provided. Each slide rail has two channels, one on each side of the slide rail. Each channel has, at each end, stops to prevent the end rollers of the van frame members and the container frame members from rolling out of the channel at the end of the slide rail.

Attached to the base of the container are container frame members, also each having a pair of rollers. The first of each of these pair of rollers are the container end rollers which are attached at the innermost ends of the container members, which are at the opposite end from those of the van frame members. The second roller of each pair of container rollers is the container frame intermediate stop roller, which are also located approximately one-third of the length of the container frame back from the container end rollers.

The container rollers are inserted into the channels of the side rails opposite those which hold the van frame rollers. Roller stops are provided at the ends of the container frame channels in the same manner as the stops which are found at the ends of the van frame channels.

With this type of suspension system, the operator can open the cargo doors of the trade van, and commence to withdraw the container from the van. When doing so, the container frame, supported by its rollers and the channels of the slide rail, will travel, in the channels, approximately two-thirds of the length of the slide rails until the intermediate stop rollers engage the stops at the end of the container slide rail channels. When this happens, the forces of withdrawal will be transmitted to the slide rails which are suspended and supported by the van frame rollers held within the van roller channels of the slide rails. As the operator continues to withdraw the container from the van, the slide rails will travel until the van frame intermediate stop rollers engage the stops at the end of the van roller channels of the slide rails.

If the intermediate stop rollers of both the van frame and container frame members are positioned to allow the van frame and container frame members to travel, relative to the slide rails, approximately two-thirds the length of each member, then the net result is that the container has been withdrawn approximately four-thirds of the length of the various members. Hence the container will be completely outside of the trade van and supported by the cantilevered, extended frame assembly.

Each frame member and roller is stoutly built and able to withstand the cantilevered forces associated with holding a 2,000 pound payload suspended above the ground outside of the trade van.

When the operator desires to insert the container back into the trade van he merely reverses the actions, wherein the container frame end rollers travel to the stop at the opposite end of the slide rail channels, are whereupon the insertion forces are transferred to the slide rails which, being supported by the van frame rollers, then travel the length of the slide rails until the van frame end rollers engage the stop at the opposite end of the van frame roller channels.

Once the container has been fully inserted into the trade van, a latch is provided to hold it in place during transport. The latching mechanism is a pivoting latch bar which engages in notch in a short extension of a van frame member to prevent the container from moving during transport.

The container has a plurality of bins and shelves for storage of various parts, supplies and tools. It is adaptable for a variety of uses, depending upon the needs of the tradesman.

DETAILED DESCRIPTION OF THE PREFERRED EMBODIMENT

Figure 1:
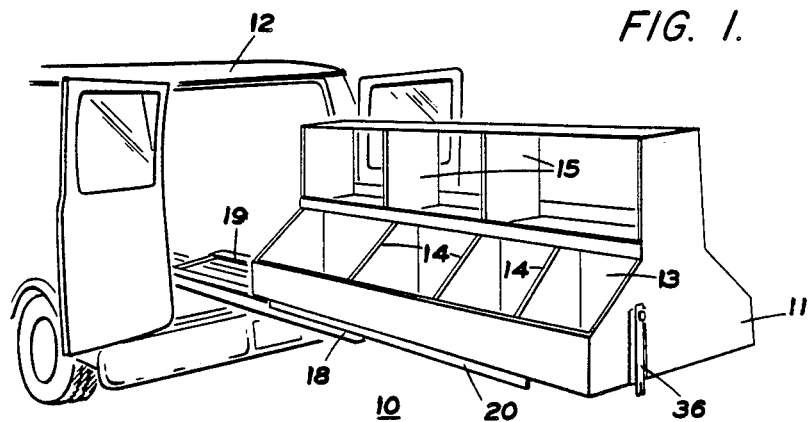
FIG. 1 is a representational perspective view of the container in a fully withdrawn position.

First referring to FIG. 1 my slidable storage container 10 is shown to advantage in a fully withdrawn position from van 12. Container 11 is made of conventional materials such as wood, plastic, galvanized sheet metal or fiberglass, depending upon the particular configuration necessary for the particular use for slidable container 10. Center divider 13 together with adjustable bin dividers 14 are used to divide a lower section of the container into a plurality of bins, open at the top, and accessible from one side of container 11 or the other. Upper shelves are formed by the use of shelf dividers 15. The upper shelves are accessible from either side of container 11.

Figure 2:
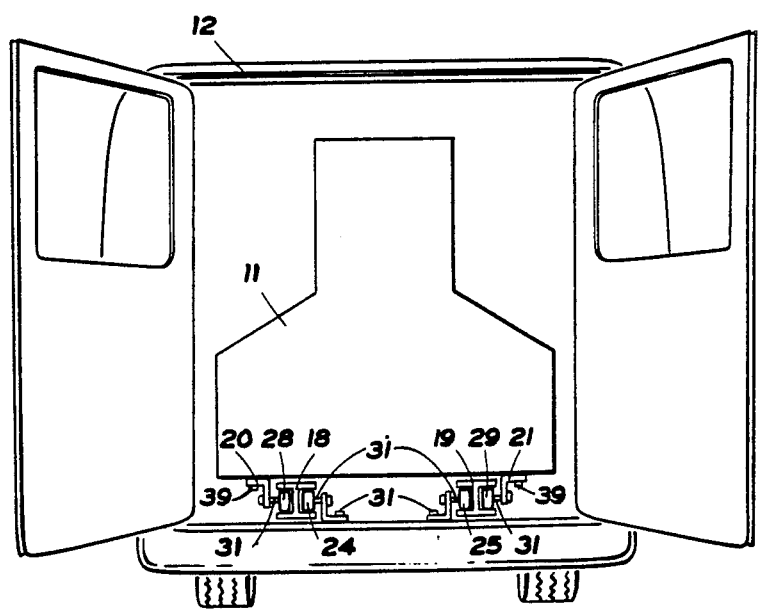
FIG. 2 is a representational back view showing a container inserted into a trade van.

As can be seen in FIG. 2, container 11 when fully inserted into van 12 utilizes substantially all of the available volume of cargo area for storage purposes. It should be noted that FIG. 2 is representational in nature in that latch bar 36, and the associated mechanism as is shown in FIGS. 1 and 4 are omitted from the drawings so as to better illustrate the telescoping extension frame assembly which is shown to advantage in FIGS. 2 and 3.

Figure 3:
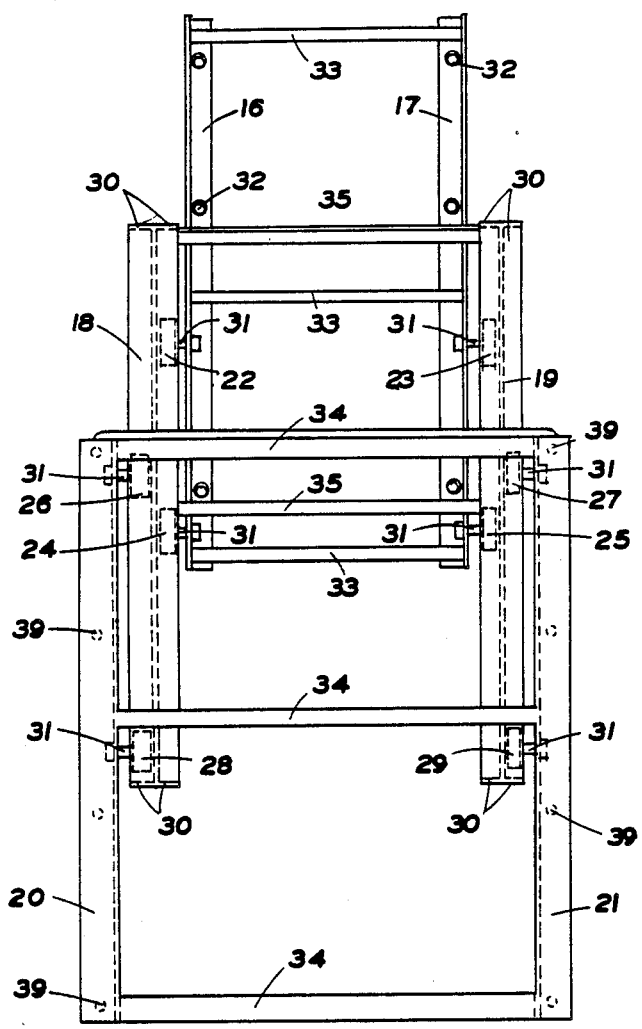
FIG. 3 is a top view of the frame assembly.
Figure 4:
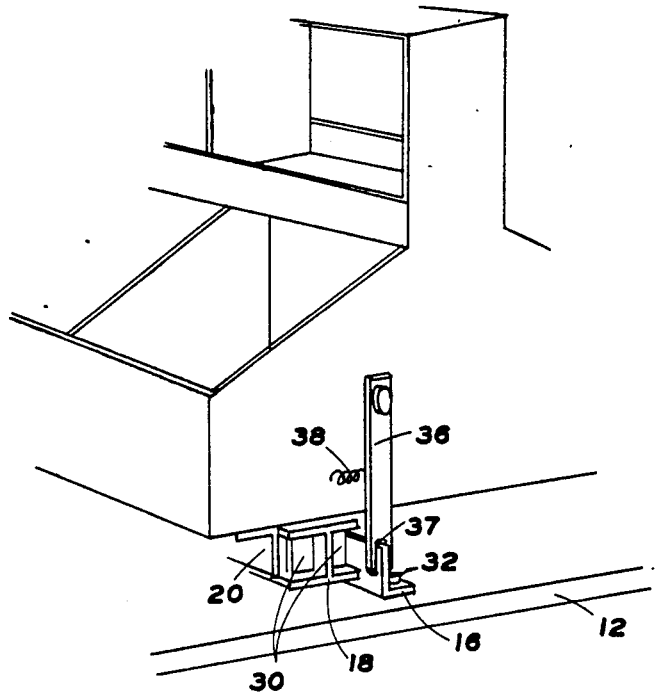
FIG. 4 is a representational view of the container in a locked, transport position.

Referring to FIGS. 1, 2 and 3 the telescoping extension frame is shown to advantage.

Bolted to van bed 12 is the van frame assembly which is made up of two parallel van frames, the first being the left van frame 16 and the other, right van frame 17. Van frame cross members 33 are provided to rigidly hold left van frame 16 and right van frame 17 securely in parallel spaced relationship. Mounting bolts 32 are provided to securely attach the van frame assembly to the bed or frame of van 12. Attached to the van frame assembly are two sets of equidistant rollers. Attached to left van frame 16 are left van end roller 24 and left van intermediate stop roller 22. Attached to right van frame 17, in a mirror image alignment to the left van frame roller assembly, are right van end roller 25 and right van intermediate stop roller 23. Each of these rollers is rotatably attached to the frame member by means of roller axles 31.

The actual length of container 11 can be shortened to allow a storage area for large or bulky items behind the front seats of the van, and accessible through the side cargo doors.

Although it will depend upon the length of the available cargo area, and the length of the various component parts of the telescoping frame assembly, in practice it has been found that the distance between the van frame end rollers 24 and 25 and their respective van frame intermediate stop rollers 22 and 23 is approximately 2 feet 6 inches.

Left slide rail 18 and right slide rail 19 are provided as the intermediate sections of a telescoping extension frame assembly. Each slide rail has, in its configuration, channels defined for receiving the roller assemblies of the van frame comprised of left and right van frame end rollers 24 and 25 and left and right van frame intermediate stop rollers 22 and 23. As can be shown in FIG. 2, which deliberately omits from the drawing end stops 30, left van frame end roller 24 and left container frame intermediate stop roller 28 are of close conforming size and radius to the channels of left side rail 18. In a like manner right van frame end roller 25 and right container frame intermediate stop roller 29 are inserted in the channels of right side rail 19. The purpose for this is that when container assembly 10 is fully withdrawn from van 12 it is the extension frame assembly supports container 11 in a cantilevered fashion. Thus all rollers are subject to alternating downward directional loading when supporting the weight of container 11 when container 11 is fully inserted into the van and the end rollers are subject to reverse directional loading when container 11 is fully extended from the van 12 and is held in position by means of the cantilevered stresses upon the telescoping extension frame.

Referring to FIGS. 1 and 3, left container frame 20 and right container frame 21 are attached to the bottom of container 11. Attached to left container frame 20 by means of roller axles 31 are left container frame end roller 26 and left container frame intermediate stop roller 28. Likewise, right container frame end roller 27 and right container frame intermediate stop roller 29 are attached to right container frame 21. Left container frame end roller 26 and left container frame intermediate stop roller 28 are inserted into the container frame channel defined within left slide rail 18 as is shown in FIGS. 2 and 3. In a like manner right container frame end roller 27 and right container frame intermediate stop roller 29 are inserted into the container frame channel of right slide rail 19. As is the case for the van frame assembly, the rollers attached to the container frame assembly must be stoutly made and able to withstand substantial vertical forces in either the up or down direction.

In practice it has been found that the distance required between the container frame end rollers 26 and 27 and the intermediate stop rollers 28 and 29 is approximately 2 feet, depending upon the particular configuration of van 12 and container assembly 10.

Next, referring to FIGS. 1, 3 and 4, the latching mechanism is shown to advantage. Latch bar 36 is pivotally attached to container 11 and positioned for engagement with notch 37 which is cut into the vertically extending portion of left frame member 16. It should be noted from FIGS. 3 and 4 that left frame member 16 is slightly longer in length than right van frame member 17 so as to facilitate the location of the notch 37 for engagement with latch bar 36. Spring 38 and stop 40 are provided to securely hold latch bar 36 in place once it has been inserted into slot 37.

Not shown in the drawings, and this should be apparent to anyone skilled in the art, that the actual configuration of the bins and shelves and drawers of container 11 is as variable as the needs of the particular application. Easily adapted and mounted to container 11 are such items as brackets for holding ladders, drawers, covers for bins and doors for shelving.

While there is shown and described the present preferred embodiment of the invention, it is to be distinctly understood that this invention is not limited thereto but may be variously embodied to practice within the scope of the following claims. Accordingly,

What I claim is:

1. A storage container for use in an enclosed van which comprises:
    a plurality of van frame members attached to the floor of the cargo area of a van that is directly accessible through a cargo door, in parallel spaced relationship to each other, and, all perpendicular to the cargo door of the van; and
    van frame end rollers rotatably attached to the ends extending toward the cargo doors of each of the van frame members; and
    a plurality of van frame intermediate stop rollers rotatably attached to each of the van frame members in parallel and equidistant relationship to the van frame end rollers; and
    said rollers of conforming size and diameter for insertion into a channel of a slide rail; and
    a plurality of slide rails held in parallel spaced relationship to each other, each of said slide rails having a van roller channel on a side for receiving said van frame intermediate and end rollers, and having at the ends of each of said channels, means for stopping the travel of said van rollers; and
    said slide rails each further having, on the opposite side from the van channel, a container channel for receiving container intermediate stop and end rollers, and having at the ends of each of said container channels, means for stopping the travel of container rollers; and
    a plurality of container frame members held in parallel spaced relationship; and
    container frame end rollers rotatably attached to one end of each of said container frame members, said container frame end rollers being of conforming size and diameter for insertion into the container channels of the slide rails; and
    container frame intermediate stop roller rotatably attached to each of the container frame members in parallel and equidistant relationship to the container frame end rollers; and
    a container for the storage of goods attached to the container frame members.

2. The storage container of claim 1 wherein the distance between the equidistant van frame end rollers and the van frame intermediate stop rollers, and the distance between the equidistant container frame end rollers and container frame intermediate stop rollers, are all set so as to allow the container to be fully withdrawn from the van through the cargo door of said van.

3. The storage container of claim 2 wherein said container is adapted to utilized substantially all of the volume of the cargo area of the van.

* * * * *